(12) United States Patent
Sugiura et al.

(10) Patent No.: US 12,333,163 B2
(45) Date of Patent: Jun. 17, 2025

(54) DATA-SAVING SYSTEM

(71) Applicant: FUJI CORPORATION, Chiryu (JP)

(72) Inventors: Satoshi Sugiura, Tokoname (JP);
Hideya Kuroda, Toyota (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 18/551,645

(22) PCT Filed: Mar. 31, 2021

(86) PCT No.: PCT/JP2021/014002
§ 371 (c)(1),
(2) Date: Sep. 21, 2023

(87) PCT Pub. No.: WO2022/208800
PCT Pub. Date: Oct. 6, 2022

(65) Prior Publication Data
US 2024/0168665 A1    May 23, 2024

(51) Int. Cl.
*G06F 3/06* (2006.01)
(52) U.S. Cl.
CPC .......... *G06F 3/0631* (2013.01); *G06F 3/0626* (2013.01); *G06F 3/067* (2013.01)
(58) Field of Classification Search
CPC .... G06F 16/182; G06F 3/0608; G06F 3/0626; G06F 3/0631; G06F 3/0638; G06F 3/0665; G06F 3/067; G06F 3/0683
See application file for complete search history.

(56) References Cited

U.S. PATENT DOCUMENTS

| 2011/0193973 A1* | 8/2011 | Motoki | H04N 1/00461 348/207.1 |
| 2019/0222712 A1* | 7/2019 | Nakamura | H04N 1/32058 |

FOREIGN PATENT DOCUMENTS

JP    2004-70403 A    3/2004

OTHER PUBLICATIONS

International Search Report issued Jul. 6, 2021 in PCT/JP2021/014002, filed on Mar. 31, 2021, 2 pages.

* cited by examiner

*Primary Examiner* — Yong J Choe
(74) *Attorney, Agent, or Firm* — Oblon, McClelland, Maier & Neustadt, L.L.P.

(57) ABSTRACT

A data-saving system includes a data-saving section to acquire and save multiple pieces of data generated when a board working machine performs a board work, a standard storage section that is a candidate for a save destination for saving the data, an additional storage section that is capable of being added to the system and removed from the system, the additional storage section being a candidate for the save destination for saving the data, a degree-of-priority setting section to set a degree of priority for saving for each of the multiple pieces of data based on an execution state of the board work when the data is generated, and a save destination control section to control the save destination of the data based on the set degree of priority while referring to one or more conditions of a condition of presence or absence of the additional storage section.

17 Claims, 6 Drawing Sheets

| IMAGE PROCESSING RESULT | | PRIORITY | NUMBER OF PIECES OF DATA |
|---|---|---|---|
| OUTSIDE ALLOWABLE RANGE | ABNORMALITY | FIRST | SMALL NUMBER |
| WITHIN ALLOWABLE RANGE | ABNORMALITY SIGN | SECOND | RELATIVELY SMALL |
| | NORMALITY | THIRD | LARGE NUMBER |

| CONFIGURATION OF STORAGE SECTION / PRIORITY | ONLY MS | MS + MA1 | MS + MA1 + MA2 |
|---|---|---|---|
| FIRST | MS | MS | MS |
| SECOND | — | MA1 | MA1 |
| THIRD | — | MA1 | MA2 |

| CONFIGURATION OF STORAGE SECTION / PRIORITY | ONLY MS | MS + MA1 | MS + MA1 + MA2 |
|---|---|---|---|
| FIRST | MS | MS | MS |
| SECOND | MS | MA1 (OR MS) | MA1 |
| THIRD | MS | MA1 | MA2 |

| BOARD TYPE<br>PRIORITY | KA<br>NOT IMPORTANT | KB<br>IMPORTANT | KC<br>LARGE NUMBER OF PRODUCTION VOLUME | KD<br>SMALL NUMBER OF PRODUCTION VOLUME |
|---|---|---|---|---|
| FIRST | MS | MS | MS | MS |
| SECOND | — | MA1 | MA1 | MA1 |
| THIRD | — | MA1 | — | MA1 |

| IMAGE PROCESSING RESULT | | PRIORITY | | |
|---|---|---|---|---|
| | | NORMAL TIME | PREDETERMINED PERIOD 1 | PREDETERMINED PERIOD 2 |
| OUTSIDE ALLOWABLE RANGE | ABNORMALITY | FIRST | FIRST | FIRST |
| WITHIN ALLOWABLE RANGE | ABNORMALITY SIGN | SECOND | FIRST | FIRST |
| | NORMALITY | THIRD | FIRST | SECOND |

DATA-SAVING SYSTEM

TECHNICAL FIELD

The present description relates to a data-saving system that saves multiple pieces of data generated when a board working machine performs a board work in a storage section.

BACKGROUND ART

There have been spreading techniques for mass-producing board products by performing a board work on a board on which printed wiring is laid. Furthermore, it is common to form a board working line by arranging multiple board working machines for performing the board work. Multiple board working machines generate data when performing the board work. Examples of such data include image data acquired by capturing an image by a camera provided in the board working machine, log data in which an operation history of the board working machine is recorded, and the like. These data are saved for the purpose of improving the traceability of the board product and for reference when improving the operation conditions of the board working machine. One technical example relating to this type of data storage is disclosed in Patent Literature 1.

A file storage destination volume control method disclosed in Patent Literature 1 includes a step of calculating a storage requirement (reliability requirement and performance requirement) for each file that has received a storage request, a step of calculating a storage destination volume of a file according to a calculated storage requirement and the reliability characteristic and performance characteristic of each volume, and a step of distributing and storing the file in the calculated storage destination volume. According to this method, it is possible to optimize the file storage destination in units of files, and efforts for performing complicated settings by an administrator are not generated.

PATENT LITERATURE

Patent Literature 1: JP-A-2004-70403

BRIEF SUMMARY

Technical Problem

Incidentally, in the method of Patent Literature 1, the storage destination volume compatible with the storage requirement calculated for each file is obtained, and the files are distributed and stored. According to the description of the embodiment, a level of storage requirement is calculated for a business application, a user type, or a client type, and a file (important file) having a high storage requirement is stored in a volume (high performance volume) having high reliability and performance. In general, in addition to the method of Patent Literature 1, in a case where an unused area of a volume is exhausted, an old file is subsequently deleted, and a new file is saved. Here, an unreasonable and inefficient use state of a volume (storage section) may occur in which an unused area of a high performance volume storing an important file is exhausted and an old important file needs to be deleted, while an unused area of a volume storing an unimportant file is excessive.

Furthermore, in many cases, a countermeasure is performed in which a new storage section such as an external storage device is added to an exhaustion of the unused area of the storage section. The method of Patent Literature 1 cannot flexibly deal with such a change in the configuration of the storage section.

Therefore, an object of the present description is to provide a data-saving system capable of suppressing excessive deletion while securing the number of saved data with high degree of priority by controlling a save destination of data generated when performing a board work by a board working machine in accordance with a change in a configuration of a storage section and a change in a use state of a storage capacity.

Solution to Problem

The present description discloses a data-saving system including a data-saving section configured to acquire and save multiple pieces of data generated when a board working machine performs a board work, a standard storage section that is a candidate for a save destination for saving the data, an additional storage section that is capable of being added to the system and removed from the system, the additional storage section being a candidate for the save destination for saving the data, a degree-of-priority setting section configured to set a degree of priority for saving for each of the multiple pieces of data based on an execution state of the board work when the data is generated, and a save destination control section configured to control the save destination of the data based on the set degree of priority while referring to one or more conditions of a condition of presence or absence of the additional storage section, a condition of the number of the added additional storage sections, and a condition of storage capacities of the standard storage section and the added additional storage section.

Advantageous Effects

In the data-saving system disclosed in the present description, the save destination control section controls the save destination of the data based on the set degree of priority while referring to one or more conditions of the condition of the presence or absence of the additional storage section, the condition of the number of the added additional storage sections, and the condition of storage capacities of the standard storage section and the added additional storage section. With this system, the data-saving system can adjust the save destination of the data having a low degree of priority according to the change in the configuration of the storage section or the change in the use state of the storage capacity while preferentially saving the data having a high degree of priority, or omit the storage. Accordingly, it is possible to suppress exhaustion of an unused area of the storage section and suppress excessive deletion while securing the number of saved data having a high degree of priority. In addition, by securing the number of saved data having a high degree of priority, it is possible to greatly contribute to improvement in the traceability of the board product, improvement in the operation conditions of the board working machine, and the like.

DESCRIPTION OF EMBODIMENTS

Figure 1:
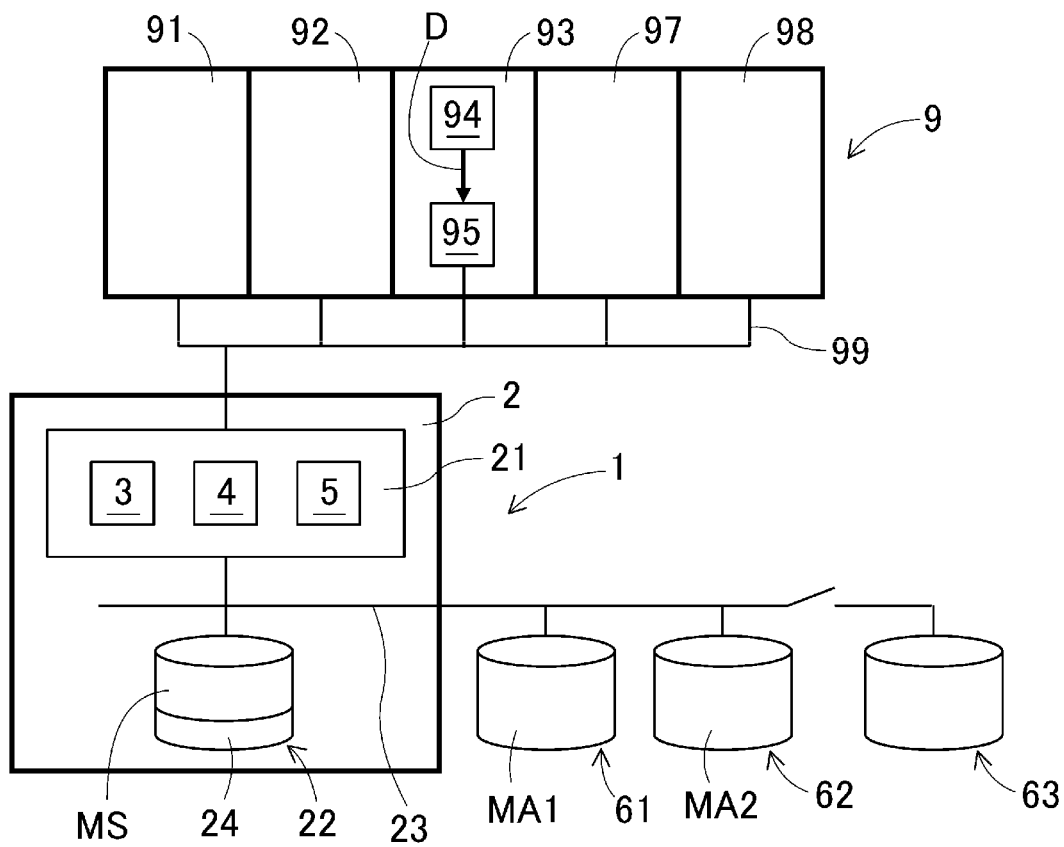
FIG. 1 is a diagram schematically illustrating a system configuration of a data-saving system of a first embodiment.

1. Configuration of Board Working Line 9

First, a configuration of board working line 9 to which data-saving system 1 of the first embodiment is applied will be described with reference to FIG. 1. Board working line 9 includes five board working machines, that is, solder printing machine 91, solder inspection machine 92, component mounter 93, board inspection machine 97, and reflow machine 98 arranged side by side.

Solder printing machine 91 repeatedly performs a printing work for printing a paste-like solder at a predetermined position on a board. Solder printing machine 91 includes a board conveyance device, a screen having a circuit pattern formed in a groove shape and placed on an upper surface of a board, a squeegee moving on the screen to print the solder, and the like. Solder inspection machine 92 repeatedly performs a solder inspection operation for determining quality of the printing state of the solder. Solder inspection machine 92 includes, for example, a board conveyance device, an inspection camera for capturing an image of the printed solder to acquire image data, an image processing section for performing image processing on the image data to determine the quality of the printing state, and the like.

Component mounter 93 repeatedly performs a component mounting work of mounting a component on the solder printed on the board. Component mounter 93 includes, for example, a board conveyance device, a component supply device, a component transfer device, and the like. The component transfer device includes a component mounting tool such as a suction nozzle responsible for picking up and mounting the component, a mounting head for holding the component mounting tool, a drive mechanism for driving the mounting head in a horizontal two direction, camera 94, image processing section 95, and the like.

Camera 94 captures an image of the component mounting tool holding the component and acquires image data D. Image data D corresponds to data generated when component mounter 93, which is a board working machine, performs the component mounting work, which is the board work. Image processing section 95 performs image processing on image data D received from camera 94, and determines quality of a component holding state of the component mounting tool. More specifically, image processing section 95 stores in advance a predetermined determination criterion for determining the quality, for example, a determination criterion for defining an allowable error with respect to the position and the orientation of the held component. Image processing section 95 determines an error in the position or an error in the orientation of the held component by performing the image processing, and performs the determination in comparison with the determination criterion.

Image processing section 95 determines the quality level of the component holding state of the component mounting tool, and acquires an image processing result of any of the following (1) to (3). In the case of (1), the mounting work is stopped, and in the case of (2) and (3), the mounting work is performed.

(1) Abnormality: The actual error is outside an allowable error range of the determination criterion.

(2) Abnormality Sign: The actual error is within the allowable error range, but is relatively large. Alternatively, although the actual error is within the allowable error range, an increasing trend is observed.

(3) Normality: The actual error is within the allowable error range and there is sufficient margin for the limit of the allowable error.

Board inspection machine 97 repeatedly performs an inspection operation for inspecting a mounted state of the component mounted on the board. Board inspection machine 97 includes a board conveyance device, an inspection camera that captures an image of the component mounted on the board to acquire image data, an image processing section that performs image processing on the image data to determine quality of the component mounted state, and the like. Reflow machine 98 repeatedly performs a reflow operation in which a paste-like solder is heated, dissolved, and then cooled. As a result, the soldered portion is secured, and a board product is produced. Reflow machine 98 includes, for example, a board conveyance device, a heating device, a cooling device, a temperature adjusting device, and the like.

The line configuration of board working line 9 described above can be changed, and the structure of each board working machine can be deformed. Management computer 2 is provided to manage the overall progress of work of board working line 9. Management computer 2 is connected to solder printing machine 91, solder inspection machine 92, component mounter 93, board inspection machine 97, and reflow machine 98 using communication line 99. As a result, data communication for transmitting data in both directions via communication line 99 is enabled.

Management computer 2 incorporates arithmetic processing device 21 and internal storage device 22, and includes data bus 23. Data bus 23 allows data to be transferred between arithmetic processing device 21 and internal storage device 22. Furthermore, data bus 23 connects management computer 2 and a separate external device to enable data communication. Internal storage device 22 stores work program 24 in advance. Work program 24 is a program describing detailed procedures, execution methods, and the like of the board work for each type of board. Management computer 2 distributes work program 24 corresponding to the type of board to be produced from now on to each of the board working machines and causes work program 24 to be executed.

2. System Configuration of Data-Saving System 1 of First Embodiment

The description shifts to the description of data-saving system 1 of the first embodiment. Data-saving system 1 saves image data D acquired by camera 94 of component mounter 93. Since the number of pieces of image data D generated during the operation of board working line 9 is large and the data size is large, it is a large factor that the unused area of the storage section for saving is exhausted. Data-saving system 1 enables reasonable and efficient storage by setting a degree of priority in image data D and controlling the save destination. Image data D is not limited to raw data acquired by camera 94, and may be processing data after image processing section 95 performs image processing, or may be both raw data and processing data.

The data saved by data-saving system 1 is not limited to the above, and may be image data acquired by capturing an image by an inspection camera of solder inspection machine 92 or an inspection camera of board inspection machine 97, or image data acquired by capturing an image of a position reference mark of a board carried in by the board conveyance device by a camera provided in the board working machine. In addition, the data to be saved may be log data in which the operation history of the board working machine is recorded, or various other numerical data. Furthermore, the data to be saved may be a combination of multiple types of the above-described various data.

As illustrated in FIG. 1, data-saving system 1 includes data-saving section 3, degree-of-priority setting section 4, save destination control section 5, standard storage section MS, first additional storage section MA1, second additional storage section MA2, and the like. Data-saving section 3, degree-of-priority setting section 4, and save destination control section 5 are configured using arithmetic processing device 21 of management computer 2 and are implemented by software.

Standard storage section MS is allocated to a part of storage area of internal storage device 22. First additional storage section MA1 is allocated to first external storage device 61. First additional storage section MA1 may be exclusive of the entire storage area of first external storage device 61 or may be allocated to a part of the storage area. Second additional storage section MA2 is allocated to second external storage device 62. Second additional storage section MA2 may be exclusive of the entire storage area of second external storage device 62 or may be allocated to a part of the storage area. First external storage device 61 and second external storage device 62 are connected to management computer 2 using data bus 23.

Standard storage section MS, first additional storage section MA1, and second additional storage section MA2 are candidates for save destinations for saving image data D. First additional storage section MA1 and second additional storage section MA2 each have a significantly larger storage capacity than standard storage section MS, and can save a large number of pieces of image data D than standard storage section MS. In addition, in a case where an unused area is exhausted in each storage section, update processing for subsequently deleting old image data D and saving new image data D is performed.

Standard storage section MS resides in data-saving system 1. Meanwhile, first external storage device 61 to which first additional storage section MA1 is allocated, and second external storage device 62 to which second additional storage section MA2 is allocated can be added or removed after data-saving system 1 starts operation. That is, first additional storage section MA1 and second additional storage section MA2 are capable of being added to the system and removed from the system. Accordingly, during the period in which board working line 9 is operating, the configuration of the storage section may change, and the size of the unused area of the storage section may change discontinuously.

First additional storage section MA1 and second additional storage section MA2 may be allocated to different storage areas of one external storage device, respectively. In addition, data-saving system 1 may have a system configuration without second additional storage section MA2 or a system configuration with three or more additional storage sections. Furthermore, first additional storage section MA1 and second additional storage section MA2 may be allocated to cloud storage device 63 that is detachably connected to management computer 2 and recognized as not being added in a detached state. With this configuration, it is possible to improve the overall economic efficiency of the system by effectively utilizing the cloud system as an external resource.

Data-saving section 3 acquires image data D and the corresponding image processing result from image processing section 95 of component mounter 93. In addition, data-saving section 3 saves each image data D in the save destination determined by save destination control section 5. Data-saving section 3 is preferably acquired and saved every time image data D is generated, but can also perform batch processing of collectively processing multiple pieces of image data D.

Degree-of-priority setting section 4 sets a degree of priority for saving for each of multiple image data D based on the execution state of the component mounting work when image data D is generated. Specifically, degree-of-priority setting section 4 sets a low priority degree to image data D generated when the execution state of the component mounting work is good within a predetermined allowable range, and sets a high degree of priority to image data D generated when the execution state of the component mounting work deviates from the allowable range and is not good. In the first embodiment, degree-of-priority setting section 4 sets any of multiple priorities indicating degrees of priority for each of multiple pieces of image data D (details will be described later).

Here, the execution state of the component mounting work corresponds to an operation state such as an operation speed and an operation direction of each of sections that share and perform the component mounting work, a positional relationship between each section, the board, and the component, a positional relationship between the sections, and the like. In the first embodiment, as an execution state of the component mounting work, a component holding state of the component mounting tool is used, and the quality level is expressed by the image processing result. The lifting and lowering operation state of the component mounting tool may be adopted as the execution state of the component mounting work, and data-saving section 3 may save log data of the lifting and lowering speed history. In addition, the position and orientation of the component mounted on the board may be adopted as the execution state of the component mounting work, and data-saving section 3 may save error data of the position and orientation of the component or image data obtained by capturing an image of the mounted component.

Save destination control section 5 controls the save destination of image data D based on the set priority while referring to the condition of the presence or absence of first additional storage section MA1 and second additional storage section MA2. Furthermore, save destination control section 5 controls the save destination for each priority of image data D (details will be described later).

3. Operation of Data-Saving System 1 of First Embodiment

Figure 2:
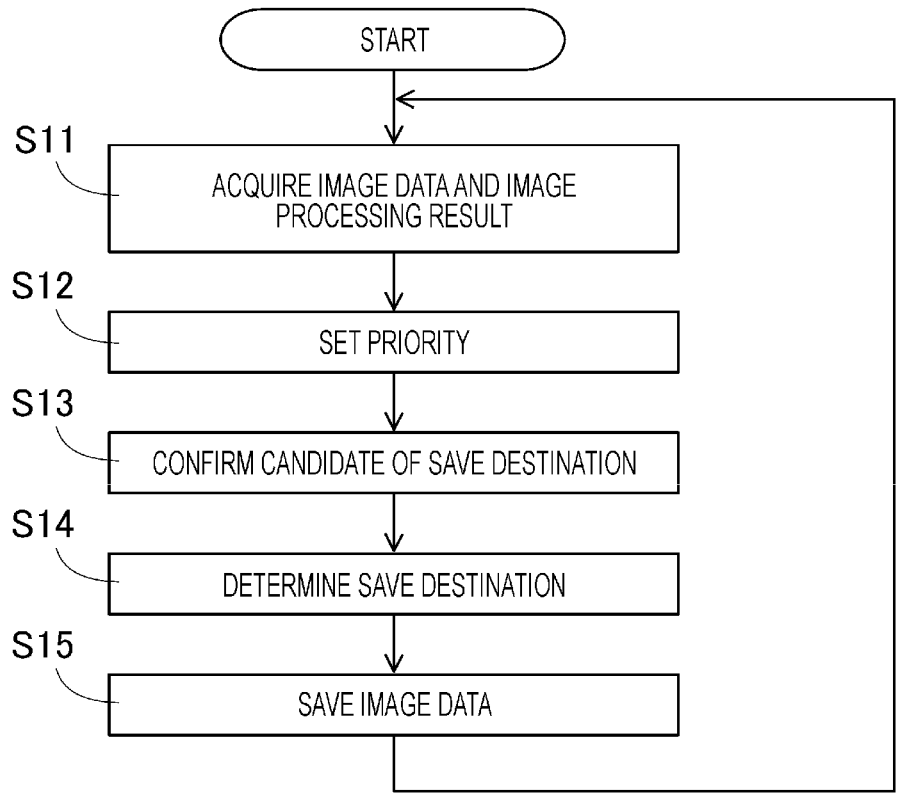
FIG. 2 is an operation flowchart of an operation of the data-saving system.

Next, the operation of data-saving system 1 of the first embodiment will be described with reference to FIGS. 2 to 5. The operation flow illustrated in FIG. 2 is executed in parallel with the operation of component mounter 93. Hereinafter, a case where first additional storage section MA1 and second additional storage section MA2 are absent when starting the operation of data-saving system 1, first additional storage section MA1 is added later, and second additional storage section MA2 is added thereafter will be described as an example.

Figures 3, 4, 5:
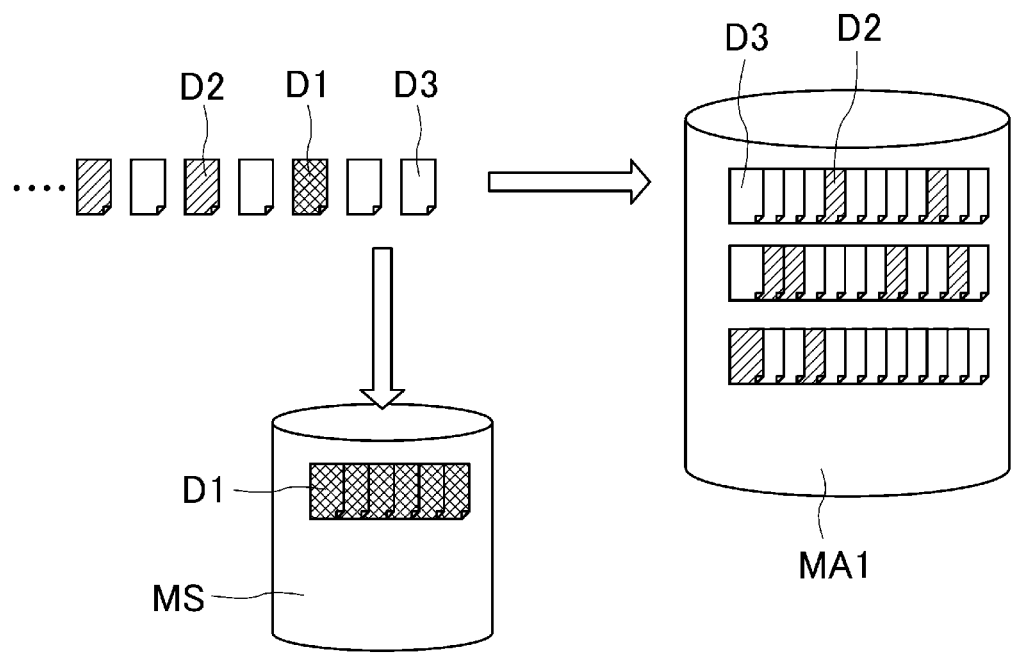
FIG. 3 is a table of a list illustrating an operation example of a degree-of-priority setting section in the operation flow.
FIG. 4 is a table of a list illustrating an operation example of a save destination control section in the operation flow.
FIG. 5 is a diagram schematically illustrating an example of a situation in which a data save destination is controlled.

In step S11 in FIG. 2, data-saving section 3 acquires one set of image data D and the corresponding image processing result from image processing section 95 completed the image processing of image data D. In next step S12, degree-of-priority setting section 4 sets the priority illustrated in FIG. 3 for image data D acquired by data-saving section 3 as a target. In FIG. 3, a correspondence relationship between the image processing results of image data D and the priorities to be set is illustrated. Furthermore, in a case where priorities are set to a large number of pieces of image data D, the correspondence relationship between the priorities and the number of pieces of data is illustrated.

As illustrated, in a case where the image processing result of image data D indicates an abnormality in the component holding state of the component mounting tool, degree-of-priority setting section 4 sets a first priority indicating a high degree of priority for image data D. In addition, in a case where the image processing result of image data D indicates an abnormality sign, degree of priority setting section 4 sets a second priority indicating an intermediate degree of priority for image data D. Furthermore, in a case where the image processing result of image data D indicates normality, degree-of-priority setting section 4 sets a third priority indicating a low degree of priority for image data D.

In addition, in a case where degree-of-priority setting section 4 sets priorities to a large number of pieces of image data D, the number of pieces of image data D having a first priority is small. In addition, although the number of pieces of image data D having a second priority is larger than that of the first priority, the number of pieces of image data D still remains relatively small. Normally, the number of pieces of image data D having a third priority is overwhelmingly large.

In next step S13, save destination control section 5 confirms the candidate of the save destination. That is, save destination control section 5 confirms whether first additional storage section MA1 and second additional storage section MA2 are added to the system in addition to standard storage section MS resident in the system. In next step S14, save destination control section 5 determines the save destination illustrated in FIG. 4 for image data D to which the priority is set by degree-of-priority setting section 4 as a target. In FIG. 4, the save destination of image data D is illustrated using the priority of image data D and the configuration of the storage section as parameters.

As illustrated, in the case where only standard storage section MS is provided but none of first additional storage section MA1 and second additional storage section MA2 is added, save destination control section 5 determines the save destination of image data D having a first priority as standard storage section MS, and determines the save destinations of image data D having a second priority and a third priority as being absent. The determined save destination is maintained until the configuration of the storage section is changed. In next step S15, data-saving section 3 saves image data D in standard storage section MS when the first priority is set, and does not save image data D when the second priority or the third priority is set. Thereafter, the execution of the operation flow is returned to step S11.

In addition, in step S14, when first additional storage section MA1 is added, save destination control section 5 maintains the save destination of image data D having a first priority as standard storage section MS, and determines the save destinations of image data D having a second priority and a third priority as first additional storage section MA1. The determined save destination is maintained until the configuration of the storage section is next changed. In addition, in a case where first additional storage section MA1 is already added when starting the operation of data-saving system 1, save destination control section 5 performs the above-described control operation immediately after the start of the operation.

As described above, the situation in which the save destination is controlled is illustrated in FIG. 5. In FIG. 5, image data D1 having a first priority is indicated by the hatching of intersecting diagonal lines, image data D2 having a second priority is indicated by the hatching of right upward diagonal lines, and image data D3 having a third priority is indicated by plain colors. As illustrated, image data D1 having a first priority is continuously saved in standard storage section MS from the start of the operation of data-saving system 1. In addition, image data D2 having a second priority and image data D3 having a third priority are not saved from the start of the operation of data-saving system 1 until immediately before first additional storage section MA1 is added, and are thereafter saved in added first additional storage section MA1.

As described above, the save destination of a small number of pieces of image data D1 having a first priority is determined as standard storage section MS, and the save destinations of a relatively small number of pieces of image data D2 having a second priority and a large number of pieces of image data D3 having a third priority are determined as first additional storage section MA1. With this configuration, since only a small number of pieces of image data D1 are saved in standard storage section MS having a small storage capacity, it is possible to suppress exhaustion of the unused area. In addition, the entire storage capacity of standard storage section MS can be allocated to image data D1 having a first priority. Accordingly, it is possible to suppress excessive deletion while securing the number of saved image data D1 having a first priority. In addition, since the exhaustion of the unused area in first additional storage section MA1 having a large storage capacity occurs before standard storage section MS, the addition of second additional storage section MA2 is requested.

When the above aspect is viewed from another point of view, it is as follows. That is, degree-of-priority setting section 4 sets a high degree of priority (first priority) to a small number of pieces of image data D1, and sets a low degree of priority (second and third priorities) to a large number of pieces of image data (D2, D3) based on a determination criterion for determining a level of a degree of priority. Save destination control section 5 controls the save destination of the image data (D1, D2, D3) so that a period during which storage of a small number of pieces of image data D1 having a high degree of priority can be performed is longer than a period during which storage of a large number of the image data (D2, D3) having a low degree of priority can be performed, while referring to the condition of the storage capacity of standard storage section MS and added first additional storage section MA1.

In addition, in step S14, when second additional storage section MA2 is added, save destination control section 5 maintains the save destination of image data D having a first priority as standard storage section MS, maintains the save destination of image data D having a second priority as first additional storage section MA1, and changes the save destination of image data D having a third priority from existing first additional storage section MA1 to new second additional storage section MA2. At this time, image data D having a third priority already saved in first additional storage section MA1 may be collectively moved to second additional storage section MA2, or may be left as it is in first additional storage section MA1. The determined save destination is maintained until the configuration of the storage section is next changed. As described above, since the save destination of a large number of pieces of image data D having third priority is changed to second additional storage section MA2, it is possible to suppress exhaustion of the unused area in first additional storage section MA1. In other words, it is possible to suppress the deletion of image data D having a second priority.

In data-saving system 1 of the first embodiment, save destination control section 5 controls the save destination of image data D based on the set priority while referring to the condition of the presence or absence of first additional storage section MA1 and second additional storage section MA2. With this configuration, data-saving system 1 can adjust the save destinations of image data D having a second priority and a third priority according to the change in the configuration of the storage section while preferentially saving image data D having a first priority in standard storage section MS, or omit the storage. Accordingly, it is possible to suppress exhaustion of the unused area of standard storage section MS and suppress excessive deletion while securing the number of saved image data D having a first priority.

In addition, by saving image data D having a first priority and a second priority, it is possible to greatly contribute to an improvement in the traceability of the board product, an improvement in the operation conditions of the board working machine, and the like. For example, when a defect in the board product is found, it is possible to contribute to the investigation of the cause of the defect by confirming the presence or absence of image data D when the component mounting work on the board or analyzing image data D. In addition, by analyzing a large number of pieces of image data D, it is possible to verify the factors of the abnormality and the abnormality sign, to improve the image capturing conditions of camera 94 and the operation conditions of the component mounting tool, and to contribute to the reduction of the abnormality.

4. Second Embodiment

Next, a data-saving system of a second embodiment will be described with reference to FIG. 6. In the second embodiment, the system configuration illustrated in FIG. 1 and the operation flow illustrated in FIG. 2 are not changed. In the second embodiment, since there is a relatively large margin in the storage capacity of standard storage section MS as compared with that of the first embodiment, the operation of save destination control section 5 executed in step S14 is changed.

Figures 6, 7:
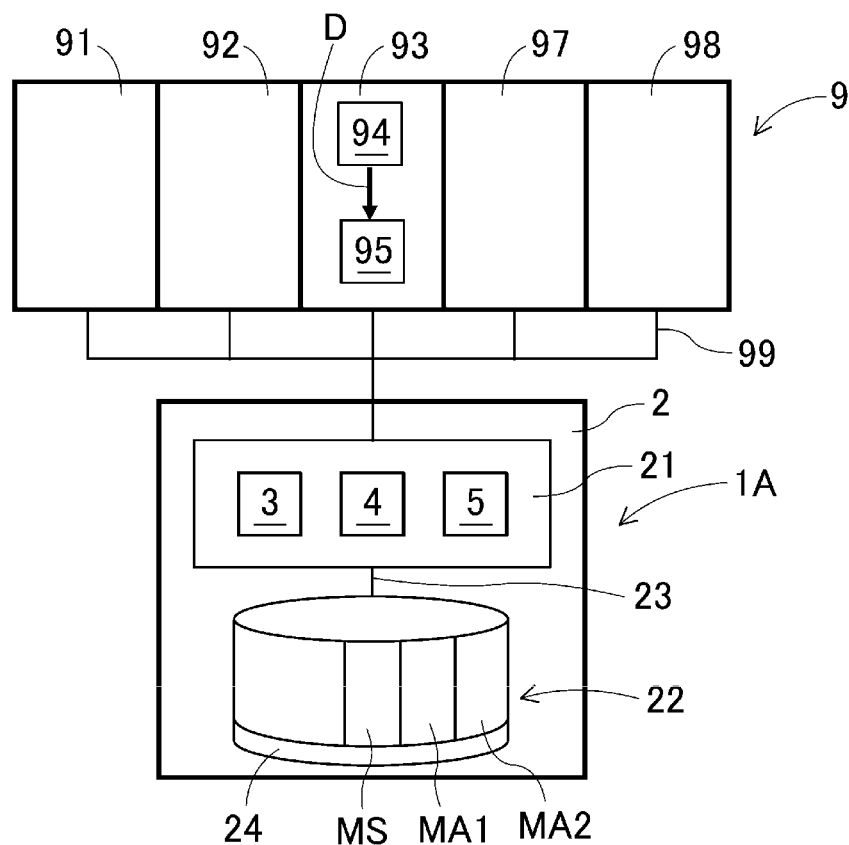
FIG. 6 is a table of a list illustrating an operation example of a save destination control section in a second embodiment.
FIG. 7 is a diagram schematically illustrating a system configuration of a data-saving system of a third embodiment.

That is, in step S14, save destination control section 5 determines the save destination illustrated in FIG. 6 for image data D as a target. As illustrated, in the case where only standard storage section MS is provided but none of first additional storage section MA1 and second additional storage section MA2 is added, save destination control section 5 determines the save destinations of all image data D from the first priority to the third priority as standard storage section MS. The determined save destination is maintained until the configuration of the storage section is changed.

In addition, when first additional storage section MA1 is added, save destination control section 5 maintains the save destination of image data D having a first priority as standard storage section MS, and changes the save destinations of image data D having a second priority and a third priority from standard storage section MS to first additional storage section MA1. At this time, image data D having a second priority and a third priority already saved in standard storage section MS may be collectively moved to first additional storage section MA1, or may be left as it is in standard storage section MS. The determined save destination is maintained until the configuration of the storage section is next changed. As a modification example, on condition that the exhaustion of the unused area of standard storage section MS is slower than that of first additional storage section MA1, save destination control section 5 may maintain the save destination of image data D having a second priority as standard storage section MS.

Furthermore, when second additional storage section MA2 is added, save destination control section 5 maintains the save destination of image data D having a first priority as standard storage section MS, maintains the save destination of image data D having a second priority as first additional storage section MA1, and changes the save destination of image data D having a third priority from existing first additional storage section MA1 to new second additional storage section MA2. At this time, image data D having a third priority already saved in first additional storage section MA1 may be collectively moved to second additional storage section MA2, or may be left as it is in first additional storage section MA1. The determined save destination is maintained until the configuration of the storage section is next changed. In the second embodiment, the effect of suppressing excessive deletion while securing the number of saved image data D having a first priority and a second priority occurs in the same manner as in the first embodiment.

5. Data-Saving System 1A of Third Embodiment

Next, data-saving system 1A of a third embodiment will be described with reference to FIG. 7. In the third embodiment, an aspect of the storage section is different from that of the first embodiment. That is, standard storage section MS includes a standard storage area in which a predetermined storage capacity is allocated to internal storage device 22. Standard storage section MS is allocated in advance and configured in advance before the start of operation of data-saving system 1A.

Meanwhile, first additional storage section MA1 and second additional storage section MA2 include additional storage areas in which a storage capacity is allocated to an area different from the standard storage area of internal storage device 22. First additional storage section MA1 and second additional storage section MA2 are configured to be allocated after the start of operation of data-saving system 1A, and are candidates for save destinations from that time point. In the third embodiment, even when the aspect of the storage section is different, the same operations as in the first and second embodiments can be performed, and similar effects occur.

6. Fourth Embodiment

Figure 8:
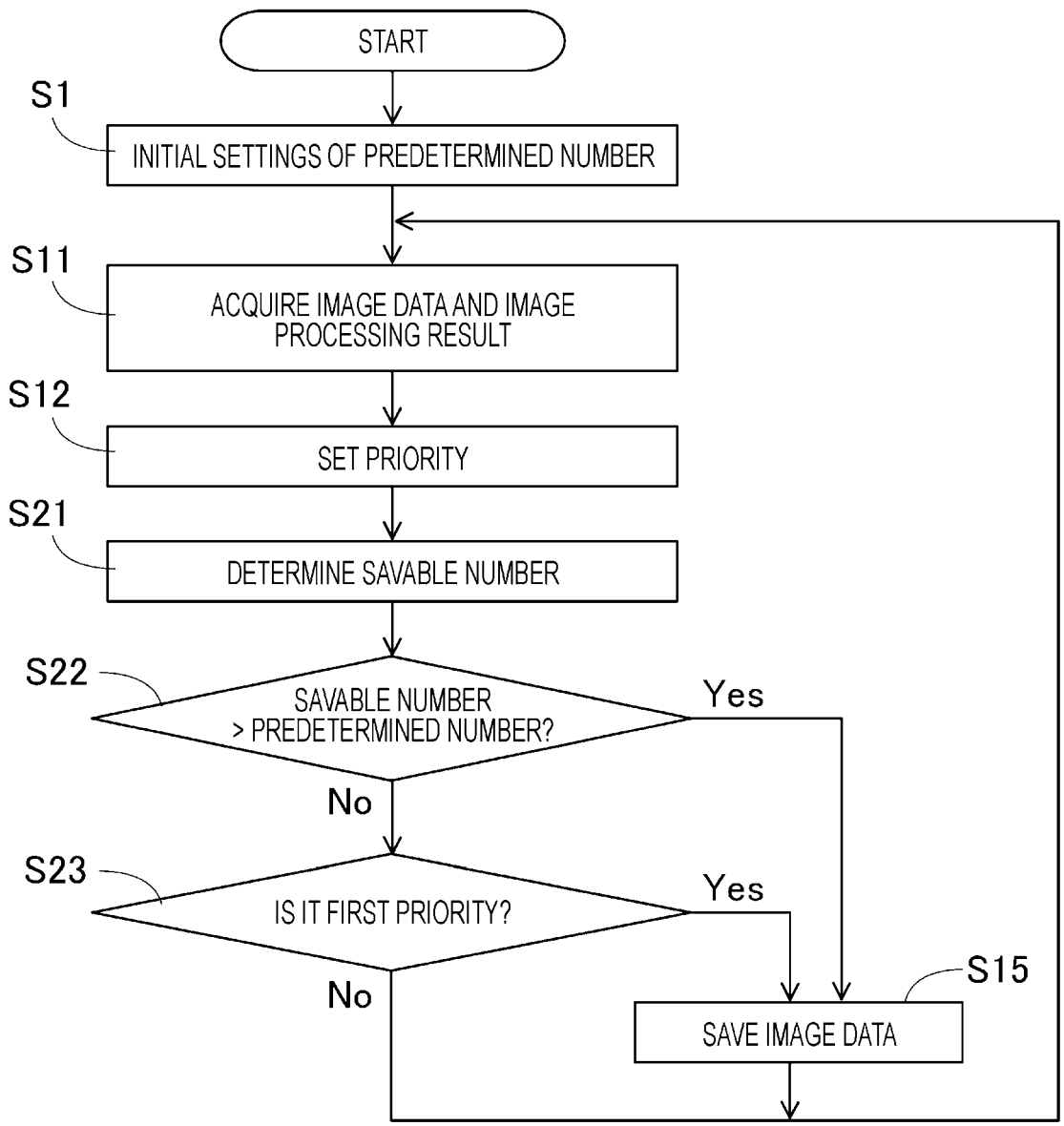
FIG. 8 is an operation flowchart of an operation of a data-saving system of a fourth embodiment.

Next, a data-saving system of a fourth embodiment will be described with reference to FIG. 8. In the fourth embodiment, the system configuration illustrated in FIG. 1 is not changed. In the fourth embodiment, the operation of save destination control section 5 is different from those of the first to third embodiments. Save destination control section 5 of the fourth embodiment controls whether to save image data D based on the set priority while referring to the condition of the storage capacity of standard storage section MS and the added additional storage section and the condition of the data size of image data D. In the fourth embodiment, save destination control section 5 controls whether to save image data D without performing control for distinguishing the candidates for the save destination of image data D.

Hereinafter, according to the operation flow of FIG. 8, the operation of save destination control section 5 will be mainly described. In step S1 in FIG. 8, initial settings of a predetermined number are performed. The predetermined number is stored in advance in internal storage device 22 or is set by an input operation by the operator. The predetermined number corresponds to a determination value for determining that the savable number of pieces of image data D that can be saved from now on has decreased. In next step S11, data-saving section 3 acquires one set of image data D and the corresponding image processing result from image processing section 95. In next step S12, degree-of-priority setting section 4 sets the priority illustrated in FIG. 3 for image data D as a target.

In next step S21, save destination control section 5 refers to the unused storage capacity and the data size of image data D to determine the savable number of pieces of image data D that can be saved from now on. Specifically, save destination control section 5 divides the unused storage capacity by the data size for each of the storage sections that are currently candidates for save destination to obtain the individually savable number (rounded down after the decimal point). Next, save destination control section 5 adds the individually savable numbers of all the storage sections to obtain the savable number.

In next step S22, save destination control section 5 determines whether the savable number exceeds a predetermined number, and branches the execution of the operation flow. In step S15 in a case where the savable number exceeds a predetermined number, save destination control section 5 causes data-saving section 3 to save image data D regardless of the priority set in image data D. In other words, in a case where the unused area of the storage section is large and the savable number is large, all image data D is saved. Thereafter, the operation flow is returned to step S11.

In addition, in step S23 in a case where the savable number is the predetermined number or less, save destination control section 5 determines whether the first priority is set in image data D, and branches the execution of the operation flow. In a case where the first priority is set, the operation flow is merged into step S15, and data-saving section 3 saves image data D. In a case where the second priority or the third priority is set, the operation flow is returned to step S11, and image data D is not saved. In other words, in a case where the number of unused areas of the storage section decreases and the savable number decreases, only image data D having a first priority is saved.

With this configuration, it is possible to suppress exhaustion of the unused area of the storage section while continuing to save image data D having a first priority, and to suppress excessive deletion while securing the number of saved image data D having a first priority. In addition, first additional storage section MA1 can be added under a situation in which only image data D having a first priority is saved in standard storage section MS with the savable number being the predetermined number or less. Furthermore, second additional storage section MA2 can be added under a situation in which only image data D having a first priority is saved in standard storage section MS and first additional storage section MA1. In a case where these additions are performed, the unused area of the storage section is discontinuously significantly increased, and all image data D can be saved again.

7. Fifth Embodiment

Figures 9, 10:
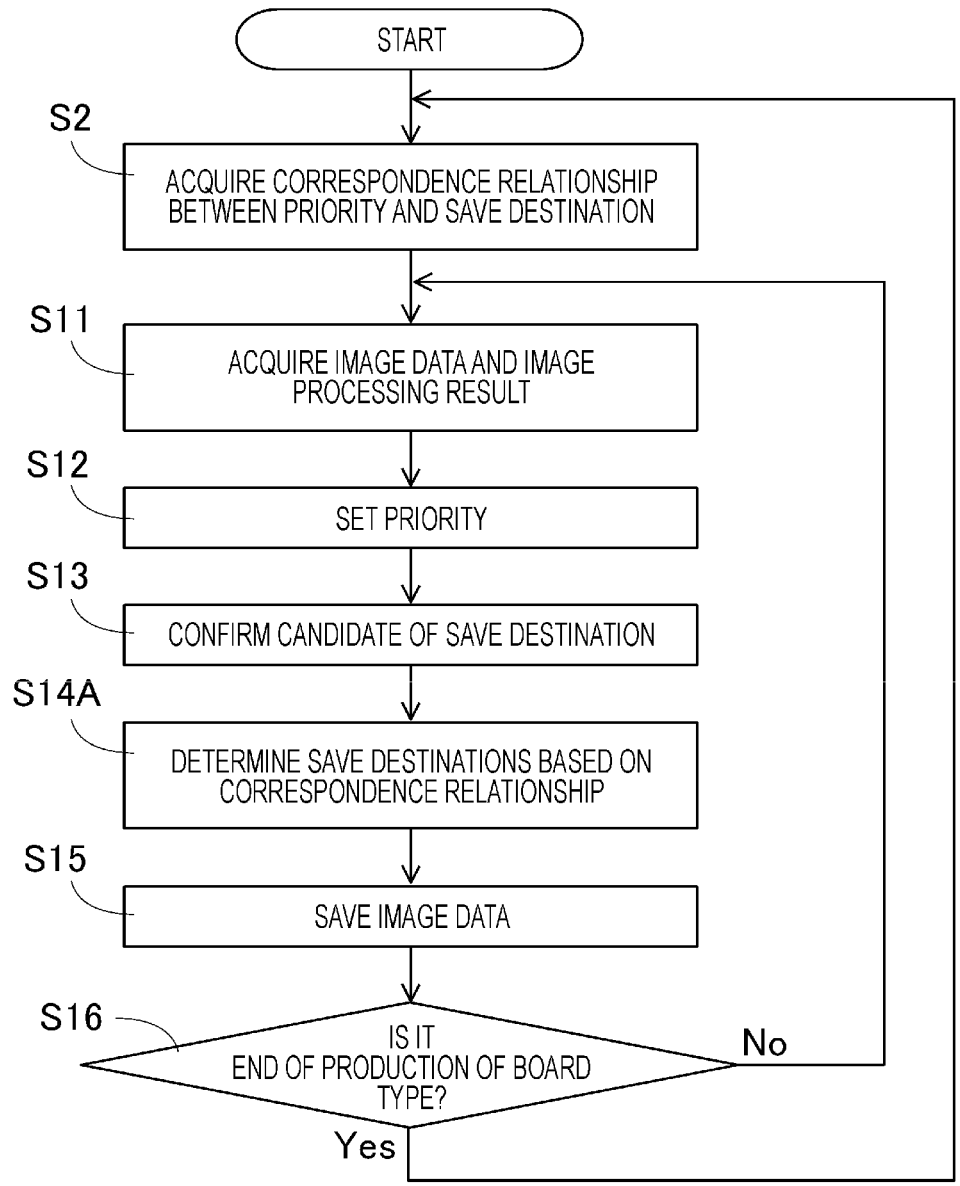
FIG. 9 is an operation flowchart of an operation of a data-saving system of a fifth embodiment.
FIG. 10 is a table of a list illustrating an example of a correspondence relationship between a priority of image data determined for each type of board and a save destination in the data-saving system of the fifth embodiment.

Next, a data-saving system of a fifth embodiment will be described with reference to FIGS. 9 and 10. In the fifth embodiment, the system configuration illustrated in FIG. 1 is not changed. In the fifth embodiment, the operation of save destination control section 5 is different from those of the first to fourth embodiments. Save destination control section 5 of the fifth embodiment controls to change the save destination of image data D according to the type of board (hereinafter abbreviated to "board type").

Hereinafter, according to the operation flow of FIG. 9, the operation of save destination control section 5 will be mainly described. In step S2 in FIG. 9, save destination control section 5 acquires the correspondence relationship between the priority of image data D determined for each board type and the save destination for a board type to be produced from now on as a target. An example of this correspondence relationship is illustrated in FIG. 10 and will be specifically described. Board type KA is considered to be not important for management because board type KA is inexpensive, or the accuracy required for the board work is loose. In other words, the necessity to save image data D is low, and in particular, the necessity to save image data D having a low priority is lowest. Therefore, for board type KA, the first priority of image data D is associated with standard storage section MS of the save destination, and the second priority and the third priority of image data D are not associated (storage is unnecessary).

Board type KB is considered to be important for management because board type KB is expensive, or the accuracy required for the board work is strict. In other words, the necessity to save image data D is high, and there is a constant necessity even for image data D having a low priority. Therefore, for board type KB, the first priority of image data D is associated with standard storage section MS of the save destination, and the second priority and the third priority are associated with first additional storage section MA1 of the save destination.

Board type KC had a large number of production volume in the past, and a large number of saved image data D are already present. Accordingly, the necessity to save image data D having a low priority is low. For board type KC, the first priority of image data D is associated with standard storage section MS of the save destination, the second priority is associated with first additional storage section MA1 of the save destination, and the third priority is not associated (storage is unnecessary).

Board type KD had a small number of production volume in the past, and saved image data D is very small. Accordingly, the necessity to save image data D is high, and there is a constant necessity even for image data D having a low priority. For board type KD, the first priority of image data D is associated with standard storage section MS of the save destination, and the second priority and the third priority are associated with first additional storage section MA1 of the save destination.

These correspondence relationships are defined in work program 24 for each board type, and save destination control section 5 can easily acquire the correspondence relationship. The configuration is not limited to this, and these correspondence relationships may be stored in internal storage device 22 in the form of the list illustrated in FIG. 10, for example. Alternatively, these correspondence relationships may be set by an operator by an input operation every time a board type to be produced is changed.

In next step S11, data-saving section 3 acquires one set of image data D and the corresponding image processing result from image processing section 95. In next step S12, degree-of-priority setting section 4 sets the priority illustrated in FIG. 3 for image data D as a target. In next step S13, save destination control section 5 confirms the candidate of the save destination. In next step S14A, save destination control section 5 determines the save destination of image data D based on the acquired correspondence relationship.

However, save destination control section 5 is required to consider the constraint of the candidate of the save destination. For example, in a case where image data D acquired when producing board type KB has the second priority, save destination control section 5 sets the save destination to first additional storage section MA1 (refer to FIG. 10), but when first additional storage section MA1 is not added, the save destination is corrected to no save destination. In next step S15, data-saving section 3 saves image data D in the save destination determined by save destination control section 5, and does not save image data D in a case where there is no save destination.

In next step S16, save destination control section 5 determines whether it is time to end the production of the board type currently being produced. In a case where the production of the board type is continued, the execution of the operation flow is returned to step S11. In step S11, data-saving section 3 acquires one set of next image data D and the corresponding image processing result. In a case where the production of the board type is completed, the execution of the operation flow is returned to step S2. In step S2, save destination control section 5 newly acquires the correspondence relationship between the priority of image data D determined for the board type to be produced next and the save destination.

In the fifth embodiment, save destination control section 5 controls to change the save destination of image data D in consideration of the board type in addition to the change in the configuration of the storage section and the change in the use state of the storage capacity. Accordingly, it is possible to more efficiently use the limited storage capacity of the storage section. In other words, it is possible to selectively save image data D with high necessity in consideration of the level of necessity of image data D changing depending on the board type.

8. Sixth Embodiment

Figures 11, 12:
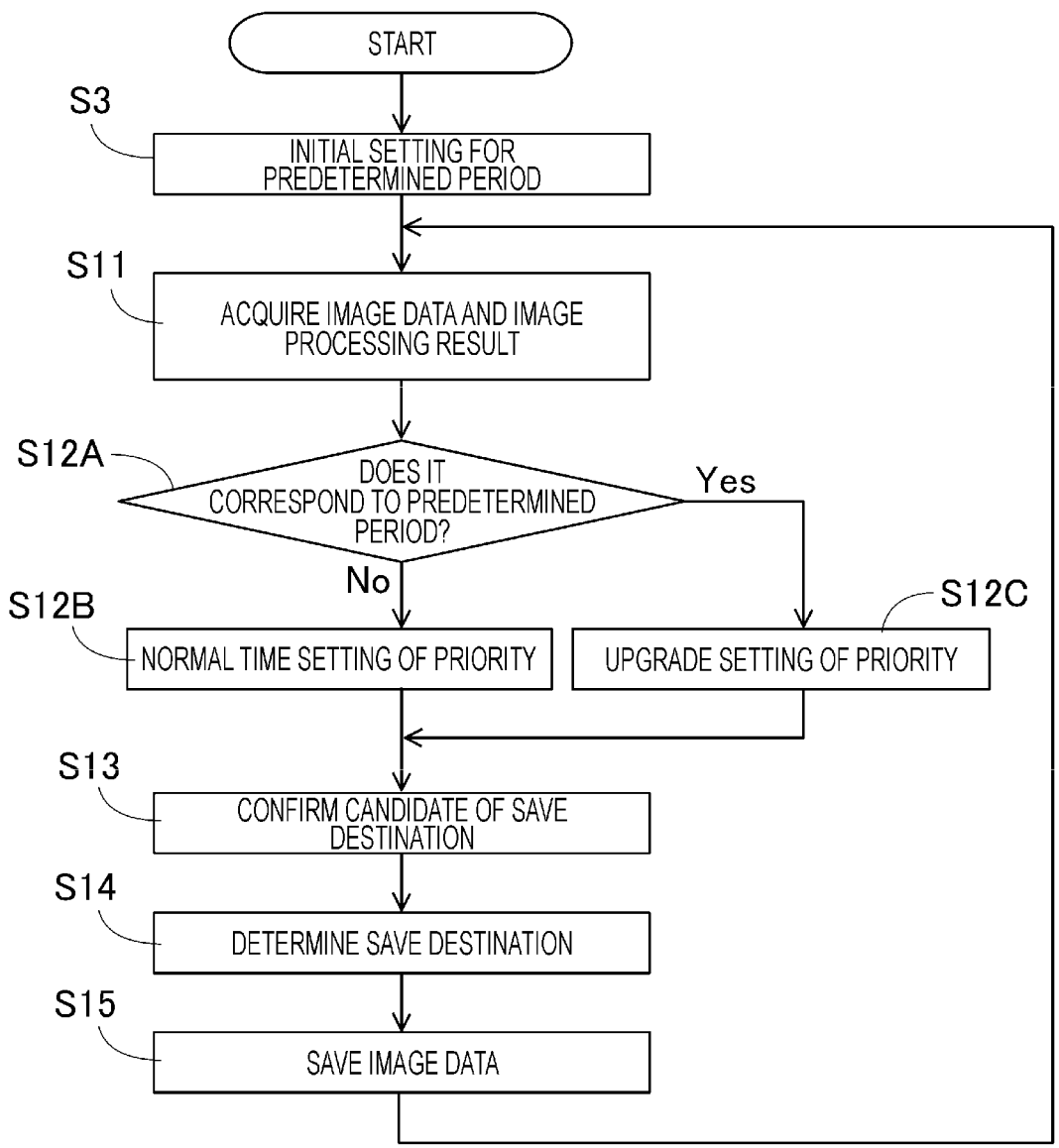
FIG. 11 is an operation flowchart of an operation of a data-saving system of the sixth embodiment.
FIG. 12 is a table of a list illustrating an operation example of a degree-of-priority setting section in the operation flow of the sixth embodiment.

Next, a data-saving system of a sixth embodiment will be described with reference to FIGS. 11 and 12. In the sixth embodiment, the system configuration illustrated in FIG. 1 is not changed. In the sixth embodiment, the operation of degree-of-priority setting section 4 is different from those of the first to fifth embodiments. Degree-of-priority setting section 4 of the sixth embodiment sets the priority of image data D acquired during a predetermined period after the execution conditions of the component mounting work (board work) are changed higher than the priority of image data D acquired before the execution conditions are changed.

Here, the execution conditions of the component mounting work correspond to an operator who assists in the component mounting work or a specific part that is responsible for the component mounting work in component mounter 93. For example, the operator assists in the component mounting work by feeding the component to the component supply device of component mounter 93 or exchanging the mounting head of the component transfer device. When the operator changes, there may be a case where the frequency of occurrence of an abnormality or an abnormality sign changes in the image processing result of image data D after the change. Accordingly, the necessity to save image data D is increased for a while after the change.

In addition, as a specific part in charge of the component mounting work, the mounting head of the component transfer device can be exemplified. When the mounting head is exchanged, there may be a case where the frequency of occurrence of an abnormality or an abnormality sign changes in the image processing result of image data D after the exchange. Accordingly, the necessity to save image data D is increased for a while after the exchange. Information (change history of the operator, exchange history of the mounting head) in which the execution conditions of the component mounting work are changed is stored in internal storage device 22. The change of the specific part responsible for the component mounting work includes an exchange of camera 94, a version upgrade of the image processing program of image processing section 95, and the like.

Hereinafter, according to the operation flow of FIG. 11, the operation of degree-of-priority setting section 4 will be mainly described. In step S3 in FIG. 11, the initial setting for a predetermined period is performed. The predetermined period is stored in advance in internal storage device 22 or is set by an input operation by the operator. The predetermined period is a period required for determining whether the change of the operator or the exchange of the mounting head affects the image processing result of image data D. For example, the predetermined period may be defined by the time such as three days, or may be defined by a working amount such as board work on 1,000 pieces of boards.

In next step S11, data-saving section 3 acquires one set of image data D and the corresponding image processing result from image processing section 95. In next step S12A, degree-of-priority setting section 4 determines whether the current time point corresponds to a predetermined period, and branches the execution of the operation flow. In step S12B in a case where the current time point does not correspond to the predetermined period, degree-of-priority setting section 4 operates in the same manner as in the first embodiment. That is, degree-of-priority setting section 4 sets the priority indicated in the column "normal time" in FIG. 12. "Normal time" means a normal time before the execution conditions of the component mounting work are changed. The set priority is the same as the priority in FIG. 3 described in the first embodiment.

In step S12C in a case where the current time point corresponds to the predetermined period, degree-of-priority setting section 4 sets upgrade setting of the priority, that is, sets to a higher priority for image data D than the normal time. For example, degree-of-priority setting section 4 sets the first priority to all image data D as illustrated in the column "predetermined period 1" in FIG. 12. Alternatively, as indicated in the column "predetermined period 2", degree-of-priority setting section 4 sets the first priority in a case where the image processing result of image data D indicates an abnormality or an abnormality sign, and sets the second priority in a case where the image processing result of image data D indicates normality. Furthermore, degree-of-priority setting section 4 may perform the setting indicated in the "predetermined period 1" in a first half of the predetermined period, and perform the setting indicated in the "predetermined period 2" in a second half of the predetermined period.

After the execution of step S12B or step S12C, the execution of the operation flow is merged into step S13. The operations in steps S13, S14, and S15 are the same as those in the first embodiment. After the execution of step S15, the execution of the operation flow is returned to step S11.

In the sixth embodiment, degree-of-priority setting section 4 changes the priority of image data D in consideration of the change in the execution conditions of the component mounting work (board work). As a result, it is possible to save a large number of pieces of image data D than in the normal time only during a predetermined period after the execution conditions are changed. Accordingly, it is possible to selectively save image data D necessary for determining whether the change in the execution conditions affects the image processing result of image data D.

9. Applications and Modifications of Embodiments

The system configuration of data-saving system 1 can be freely changed. For example, data-saving section 3, degree-of-priority setting section 4, save destination control section 5, and standard storage section MS may be provided in a computer device in component mounter 93. In addition, the priority of image data D is not limited to the three stages described in the embodiment, and may be subdivided into four or more stages, or may be two stages of a level of a degree of priority. Various other applications and modifications can be made for the first to sixth embodiments.

REFERENCE SIGNS LIST 1, 1A: data-saving system, 2: management computer, 21: arithmetic processing device, 22: internal storage device, 24: work program, 3: data-saving section, 4: degree-of-priority setting section, 5: save destination control section, 61: first external storage device, 62: second external storage device, 63: cloud storage device, 9: board working line, 93: component mounter, 94: camera, 95: image processing section, D, D1, D2, D3: image data, MS: standard storage section, MA1: first additional storage section, MA2: second additional storage section

The invention claimed is:

1. A data-saving system comprising:
a data-saving section configured to acquire and save multiple pieces of data generated when a board working machine performs a board work;
a standard storage section that is a candidate for a save destination for saving the data;
an additional storage section that is capable of being added to the data-saving system and removed from the system, the additional storage section being a candidate for the save destination for saving the data;
a degree-of-priority setting section configured to set a degree of priority for saving for each of the multiple pieces of data based on an execution state of the board work when the data is generated; and
a save destination control section configured to control the save destination of the data based on the degree of priority while referring to one or more conditions of a condition of presence or absence of the additional storage section, a condition of a number of the additional storage sections, and a condition of storage capacities of the standard storage section and the additional storage section,
wherein the save destination control section controls whether to save the data based on the degree of priority while referring to the condition of the storage capacities of the standard storage section and the additional storage section and a condition of a data size of the data.

2. The data-saving system according to claim 1, wherein the save destination control section determines the save destination of all the data as the standard storage section, while the additional storage section is not added, and
maintains the save destination of a part of the data as the standard storage section, and changes the save destination of the data of a remaining part having a lower degree of priority than that of the part of the data from the standard storage section to the additional storage section, when the additional storage section is added.

3. The data-saving system according to claim 1, wherein the save destination control section refers to an unused storage capacity and the data size to determine a savable number of pieces of the data to be saved from now on,
causes the data-saving section to save all the data while the savable number of pieces of data exceeds a predetermined number, and
causes the data-saving section to save a part of the data and not to save the data of a remaining part having a lower degree of priority than that of the part of the data after the savable number of pieces of data is the predetermined number or less.

4. The data-saving system according to claim 1, wherein the degree-of-priority setting section sets a low degree of priority to the data generated when the execution state of the board work is good within an allowable range, and sets a high degree of priority to the data generated when the execution state of the board work deviates from the allowable range and is not good.

5. The data-saving system according to claim 1, wherein the degree-of-priority setting section sets a high degree of priority to a small number of pieces of the data and sets a low degree of priority to a large number of pieces of the data, based on a determination criterion for determining a level of the degree of priority, and
the save destination control section controls the save destination of the data so that a period during which storage of the small number of pieces of the data having the high degree of priority is performed longer than a period during which storage of the large number of pieces of the data having the low degree of priority is performed, while referring to the condition of the storage capacities of the standard storage section and the additional storage section.

6. The data-saving system according to claim 1, wherein the degree-of-priority setting section sets any of multiple priorities indicating the degree of priority to each of the multiple pieces of data, and
the save destination control section controls the save destination for each priority of the data.

7. The data-saving system according to claim 1, wherein the data-saving section, the degree-of-priority setting section, and the save destination control section are configured using an arithmetic processing device of a computer,
the standard storage section is allocated to an internal storage device built into the computer, and
the additional storage section is allocated to an external storage device connected to the computer.

8. The data-saving system according to claim 1, wherein the data-saving section, the degree-of-priority setting section, and the save destination control section are configured using an arithmetic processing device of a computer,
the standard storage section is allocated to an internal storage device built into the computer, and
the additional storage section is allocated to a cloud storage device that is detachably connected to the computer and recognized as not being added in a detached state.

9. The data-saving system according to claim 8, wherein a correspondence relationship between the degree of priority of the data determined for each type of a board and the save destination is defined in a work program describing an execution procedure of the board work for each type of the board.

10. The data-saving system according to claim 1, wherein the save destination control section controls to change the save destination of the data according to a type of a board.

11. The data-saving system according to claim 1, wherein the degree-of-priority setting section sets the degree of priority of the data acquired during a predetermined period after execution conditions of the board work are changed higher than the degree of priority of the data acquired before the execution conditions are changed.

12. The data-saving system according to claim 11, wherein
the execution conditions of the board work are at least one of an operator that assists the board work and a specific part that is responsible for the board work in the board working machine.

13. The data-saving system according to claim 1, wherein the data is image data acquired by capturing an image by a camera provided in the board working machine when the board working machine performs the board work.

14. The data-saving system according to claim 13, wherein
the data is the image data acquired by capturing an image of a component mounting tool holding a component by the camera provided in a component mounter, which is the board working machine, when the component mounter performs a component mounting work, which is the board work, and
the degree-of-priority setting section sets a first priority indicating a high degree of priority for the image data in a case where a result of image processing applied to the image data indicates an abnormality in a component holding state of the component mounting tool, sets a second priority indicating an intermediate degree of priority for the image data in a case where the result of the image processing indicates an abnormality sign in the component holding state of the component mounting tool, and
sets a third priority indicating a low degree of priority for the image data in a case where the result of the image processing indicates normality in the component holding state of the component mounting tool.

15. A data-saving system comprising:
a data-saving section configured to acquire and save multiple pieces of data generated when a board working machine performs a board work;
a standard storage section that is a candidate for a save destination for saving the data;
an additional storage section that is capable of being added to the data-saving system and removed from the system the additional storage section being a candidate for the save destination for saving the data;
a degree-of-priority setting section configured to set a degree of priority for saving for each of the multiple pieces of data based on an execution state of the board work when the data is generated; and
a save destination control section configured to control the save destination of the data based on the degree of priority while referring to one or more conditions of a condition of presence or absence of the additional storage section a condition of a number of the additional storage sections and a condition of storage capacities of the standard storage section and the additional storage section, wherein
the save destination control section determines the save destination of a part of the data as the standard storage section, and determines the save destination of the data of a remaining part having a lower degree of priority than that of the part of the data as being absent, while the additional storage section is not added, and
maintains the save destination of the part of the data as the standard storage section, and determines the save destination of the data of the remaining part as the additional storage section, when the additional storage section is added.

16. The data-saving system according to claim 15, wherein
the save destination control section changes the save destination of the data of the remaining part having the lower degree of priority from an existing additional storage section to a new additional storage section, each time a second or subsequent additional storage section is added.

17. A data-saving system comprising:
a data-saving section configured to acquire and save multiple pieces of data generated when a board working machine performs a board work;
a standard storage section that is a candidate for a save destination for saving the data;
an additional storage section that is capable of being added to the data-saving system and removed from the system the additional storage section being a candidate for the save destination for saving the data;
a degree-of-priority setting section configured to set a degree of priority for saving for each of the multiple pieces of data based on an execution state of the board work when the data is generated; and
a save destination control section configured to control the save destination of the data based on the degree of priority while referring to one or more conditions of a condition of presence or absence of the additional storage section a condition of a number of the additional storage sections, and a condition of storage capacities of the standard storage section and the additional storage section, wherein the standard storage section is a standard storage area in which a predetermined storage capacity is allocated to a storage device, and the additional storage section is an additional storage area in which a storage capacity is allocated to an area different from the standard storage area of the storage device.

* * * * *